US008180521B2

(12) United States Patent
Enomoto et al.

(10) Patent No.: US 8,180,521 B2
(45) Date of Patent: May 15, 2012

(54) ELECTRONIC CONTROL SYSTEM FOR VEHICLE

(75) Inventors: Hiroyuki Enomoto, Kariya (JP); Kokichi Shimizu, Kariya (JP)

(73) Assignee: Denso Corporation, Kariya (JP)

( * ) Notice: Subject to any disclaimer, the term of this patent is extended or adjusted under 35 U.S.C. 154(b) by 429 days.

(21) Appl. No.: 12/424,996

(22) Filed: Apr. 16, 2009

(65) Prior Publication Data

US 2009/0271064 A1 Oct. 29, 2009

(30) Foreign Application Priority Data

Apr. 23, 2008 (JP) ................................ 2008-112626

(51) Int. Cl.
*G06F 19/00* (2006.01)
(52) U.S. Cl. ...................................... 701/32.8; 701/31.4
(58) Field of Classification Search .................... 701/29, 701/35
See application file for complete search history.

(56) References Cited

U.S. PATENT DOCUMENTS

| 4,271,402 | A | * | 6/1981 | Kastura et al. ................ 340/459 |
| 4,817,418 | A | * | 4/1989 | Asami et al. ................ 73/114.77 |
| 5,267,159 | A | * | 11/1993 | O'Neall ........................... 701/35 |
| 5,964,813 | A | * | 10/1999 | Ishii et al. ....................... 701/35 |
| 6,067,642 | A | * | 5/2000 | Paye ............................... 714/45 |
| 6,240,346 | B1 | * | 5/2001 | Pignato ........................... 701/35 |
| 7,890,227 | B2 | * | 2/2011 | Sayama et al. .................. 701/29 |
| 2001/0044677 | A1 | * | 11/2001 | Bauer et al. ....................... 701/1 |
| 2006/0200276 | A1 | * | 9/2006 | Sayama et al. ................... 701/1 |
| 2009/0037044 | A1 | | 2/2009 | Enomoto et al. |
| 2009/0037046 | A1 | * | 2/2009 | Teramura ........................ 701/35 |
| 2009/0037780 | A1 | * | 2/2009 | Nakagaki et al. .............. 714/48 |
| 2009/0076681 | A1 | * | 3/2009 | Yasue et al. ..................... 701/35 |
| 2009/0132117 | A1 | * | 5/2009 | Kondoh et al. ................. 701/36 |
| 2009/0234531 | A1 | * | 9/2009 | Sayama et al. .................. 701/29 |
| 2010/0292892 | A1 | * | 11/2010 | Enomoto et al. ............... 701/35 |

FOREIGN PATENT DOCUMENTS

| JP | 7-49293 | 2/1995 |
| JP | 7-239777 | 9/1995 |
| JP | 2005-83911 | 3/2005 |
| JP | 2006-291730 | 10/2006 |
| JP | 2007-122784 | 5/2007 |
| JP | 2008-019725 | 1/2008 |

OTHER PUBLICATIONS

Title 13, California Code Regulations, Malfunction and Diagnostic System Requirements for 2004 and Subsequent Model-Year Passenger Cars, Light-Duty Tucks, and Medium-Duty Vehicles and Engines (OBD II), Section 1968.2, 144 Pages.
Japanese Office Action dated Jan. 19, 2010, issued in corresponding Japanese Application No. 2008-112626, with English translation.

\* cited by examiner

*Primary Examiner* — David Dunn
*Assistant Examiner* — David E Allred
(74) *Attorney, Agent, or Firm* — Nixon & Vanderhye P.C.

(57) ABSTRACT

An electronic control unit performs self-diagnosis based on signals received from various sensors, and stores abnormality data in an EEPROM when abnormality is detected. The DTC is stored in a first memory area and a second memory area of the EEPROM, if a condition flag stored in the EEPROM is OFF and ON, respectively. The condition flag is switched from OFF (initial value) to ON, when service start data is received from a telematics service center in a period from the completion of assembling the electronic control unit to the vehicle to the start of use of the vehicle by a user.

5 Claims, 15 Drawing Sheets

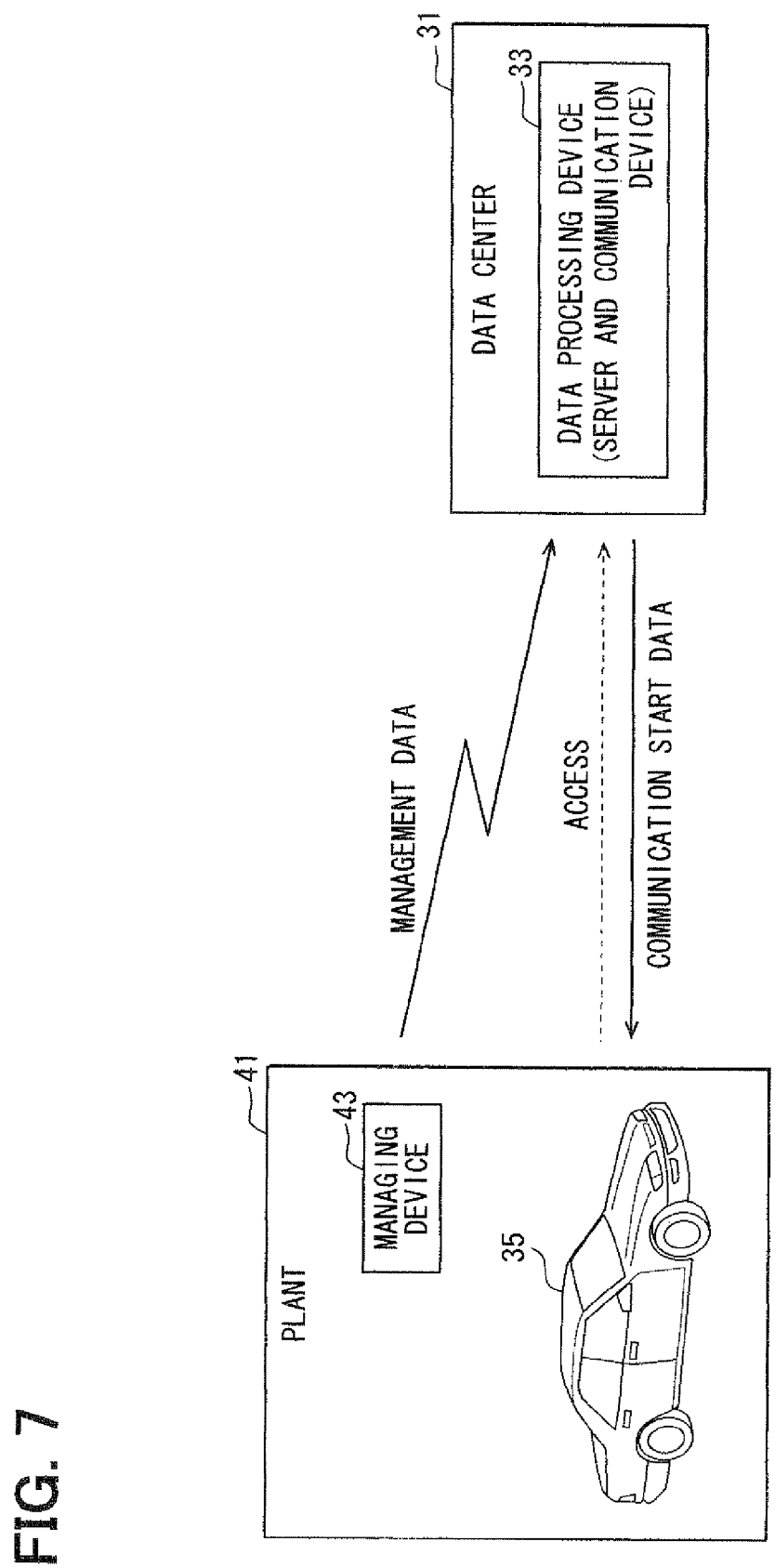

ELECTRONIC CONTROL SYSTEM FOR VEHICLE

CROSS REFERENCE TO RELATED APPLICATION

This application is based on and incorporates herein by reference Japanese Patent Application No. 2008-112626 filed on Apr. 23, 2008.

FIELD OF THE INVENTION

The present invention relates to an electronic control system for vehicle that stores as diagnosis result abnormality data in a rewritable non-volatile memory.

An electronic control system, which is mounted in a vehicle and controls various equipment such as an engine, performs a diagnosis (determination of normality or abnormality) about various check items based on data (information) from sensors mounted in the vehicle. If any abnormality is determined, abnormality data (diagnostic trouble code DTC or fault code) indicating a diagnosis result of abnormality is stored in a rewritable non-volatile memory such as an electrically erasable programmable read only memory (EEPROM) or the like.

This electronic control system is sometimes operated in the course of manufacturing a vehicle, that is, before all of peripheral devices such as sensors and actuators have been completely assembled. If the diagnosis is performed with the electronic control system being in such incompletely-mounted state, abnormality will be detected. This abnormality data will be stored in the rewritable non-volatile memory, although such abnormality data is nothing but data of abnormality detected in the course of manufacturing the vehicle before the electronic control system has been completely mounted in the vehicle.

If the user who bought the vehicle brings it to a repair shop or the like, a shop mechanic will read out such abnormality data from the rewritable non-volatile memory by using a failure diagnosis device. The mechanic will misunderstand that the vehicle is abnormal although it is in fact not so. Thus, the abnormality data produced before the electronic control system has been completely mounted in the vehicle is not necessary in the normal vehicle check process in the market.

It is therefore proposed in JP 2006-291730A not to store the abnormality data produced before the electronic control system is completely mounted. In this proposed system, it is checked whether the vehicle is in a specified condition indicating that it has been sold and is used by a user, and storing a diagnosis result in a memory is allowed only after the specified condition is satisfied.

According to this proposed system, it is not possible to later refer to abnormality data indicating abnormality detected in the assembling of such an electronic control system to a vehicle.

It should further be noted that, with regard to vehicle diagnosis, the regulation of the California Air Resources Board (CARB) requires that any diagnostic trouble code (DTC) that has been stored as a confirmed fault code based on diagnosis result must be kept stored in a rewritable non-volatile memory such as EEPROM of an electronic control unit (ECU) as a permanent failure code, such as a permanent diagnostic trouble code (PDTC). In order to prevent tampering and concealment of, for example, potential exhaust emissions failures, the regulation also stipulates that the PDTC must not be erasable by a command from an external tool capable of communicating with the ECU.

SUMMARY OF THE INVENTION

It is therefore an object of the present invention to provide an electronic control system, which separately stores in a rewritable non-volatile memory abnormality data indicating abnormality detected before a specified condition is satisfied after being assembled to a vehicle and abnormality data indicating abnormality detected after the specified condition is satisfied.

According to the present invention, an electronic control system for a vehicle has an electronic control unit including a non-volatile memory, which is rewritable with data in a plurality of memory areas thereof. The electronic control unit is configured to perform diagnosis based on data from devices mounted on the vehicle and store in the non-volatile memory the detected abnormality data.

In one aspect, the electronic control unit is configured to check whether a specified condition is satisfied, and switch the memory area of the abnormality data based on the check result. The specified condition is set to be after assembling the electronic control unit to the vehicle and before the use of the vehicle by a user.

In another aspect, the electronic control unit is configured to be operable in a function check mode for performing a function checking operation and a normal mode for performing a normal operation, and switch the memory area of the non-volatile memory for storing the abnormality data based on whether the function check mode or the normal mode is performed when the abnormality is detected.

In a further aspect, the electronic control unit is configured to switch the memory area for storing the abnormality data based on a command received from an external tool.

BRIEF DESCRIPTION OF THE DRAWINGS

The above and other objects, features and advantages of the present invention will become more apparent from the following detailed description made with reference to the accompanying drawings. In the drawings:

FIG. 7 is a schematic diagram showing transmission of communication start data from the data center to the vehicle in the second embodiment;

DETAILED DESCRIPTION OF THE EMBODIMENT

The present invention will be described in detail with reference to various exemplary embodiments.

First Embodiment

Figure 1:
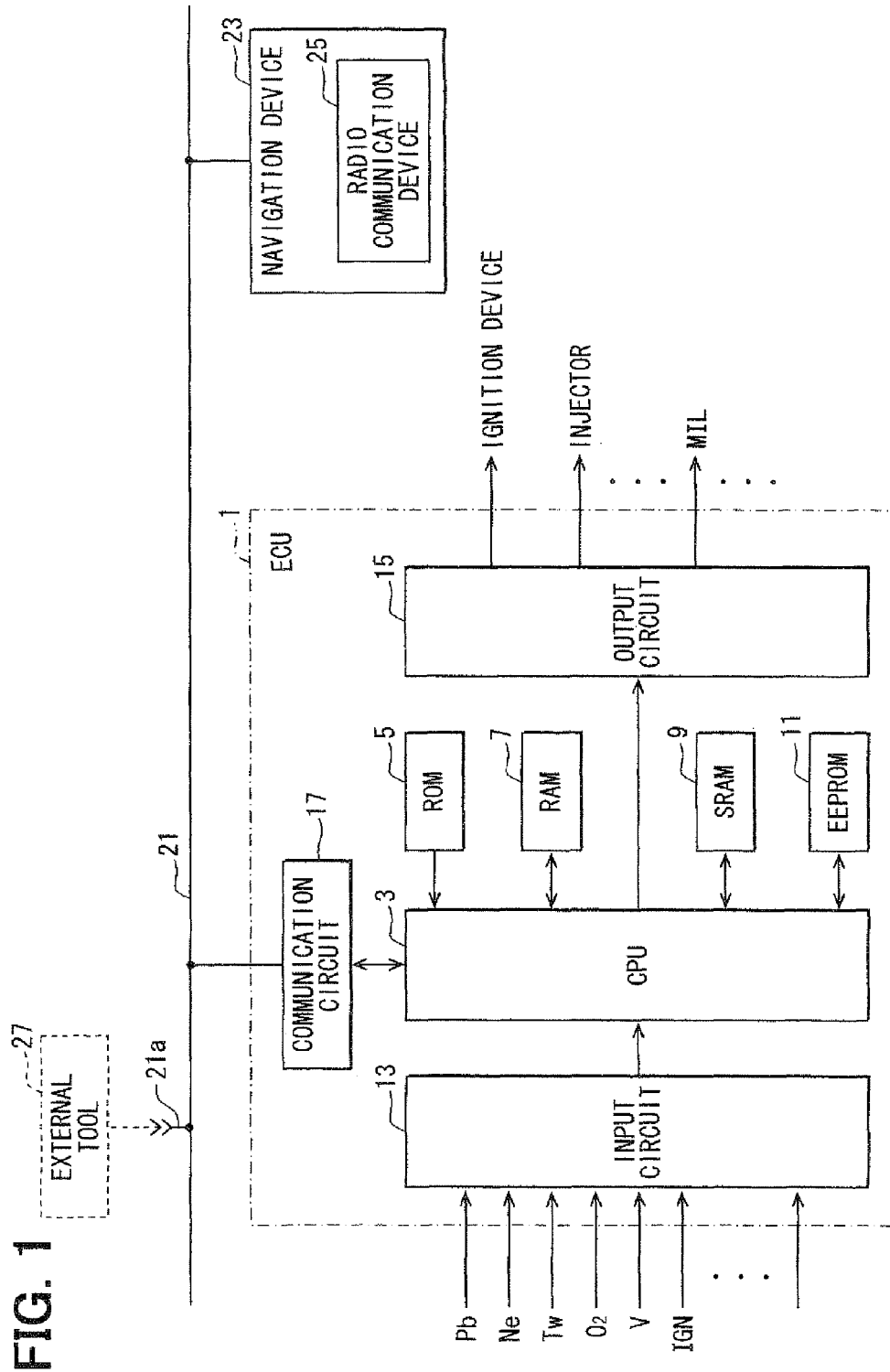
FIG. 1 is a block diagram showing an electronic control system for a vehicle including an electronic control unit (ECU) in the first embodiment.

Referring first to FIG. 1, an electronic control system in accordance with the first embodiment has an electronic control unit (ECU) 1 assembled to a vehicle to control a vehicle engine (not shown) and perform diagnosis.

The ECU 1 includes a central processing unit (CPU) 3, a read only memory (ROM) 5 that stores programs executed by the CPU 3 and data referred to at the time of program execution, a random access memory (RAM) 7 for temporarily storing data, a standby RAM (SRAM) 9 to which electric power +B is continuously supplied as a back-up power for backing up data storage even in the event normal electric power is lost, an electrically erasable programmable read only memory (EEPROM) 11 that is one of rewritable non-volatile memories, an input circuit 13, and an output circuit 15.

Various signals are input into the CPU 3 through the input circuit 13, the signals providing input data for controlling the engine. The various signals include an output Pb of an intake pipe pressure sensor, an output Ne of an engine revolution sensor, an output Tw of an engine coolant water temperature sensor, an output $O_2$ of an oxygen sensor or air-fuel ratio sensor of an exhaust system, an output V of a vehicle speed sensor, and an output IGN of an ignition switch. The output circuit 15 outputs drive signals to various electric loads, which are actuators such as an ignition device, fuel injectors, or a malfunction indicating light (MIL) according to respective commands from the CPU 3.

The CPU 3 is configured by being programmed to execute calculation for engine control based on various signals that are input to the CPU 3 through the input circuit 13, and supply commands to the output circuit 15 based on the calculation results, to thereby control the electric loads related to the control of the engine. For example, the CPU 3 calculates a valve opening timing and a valve opening period of the fuel injectors, and supplies a command for driving the injectors to the output circuit 15 based on the calculation results, to thereby control fuel injection into the engine.

The ECU 1 is also equipped with a communication circuit 17 for allowing the CPU 3 to communicate with other devices that are connected to a communication line 21 within the vehicle. The other devices may include, for example, a navigation device 23, which is external to the ECU 1. For example, the calculation value of a vehicle speed is transmitted from the ECU 1 to the navigation device 23. The navigation device 23 includes a radio communication device 25 for communicating with a data processing device in a data center 31 provided externally from the vehicle as shown in, for example, FIG. 3. The data center 31 can execute a process for implementing telematics service for the vehicle in the conventional manner.

As will be appreciated, telematics refers generally to information transfer to and from a vehicle. While a vehicle telematics system may be used for a number of purposes, including collecting road tolls, intelligent transportation systems, tracking vehicle locations, recovering stolen vehicles, automatic vehicle crash notification, location-driven driver information services, dedicated short range communications DSRC, in-vehicle early warning notification alerts for vehicle accident prevention and the like.

Further, as a failure diagnosis device, an external tool 27 for conducting a failure diagnosis of the vehicle is detachably coupled to the communication line 21 through a connector 21a. The external tool 27 is a hand-held device having a microcomputer and a display device, or may be a compact personal computer.

The power supplied to the ECU 1 includes an operation power supply supplied from an in-vehicle battery (not shown) in association with the operation of the ignition switch, and a backup power supply that continuously supplies power to the standby RAM 9 from an in-vehicle battery even when the ignition switch is in the off-position or inactive position. The ECU 1 operates upon receiving the operation power supply when the ignition switch is turned on or activated. A constant voltage generated from the backup power supply by a power supply circuit (not shown) within the ECU 1 continuously supplies power to the standby RAM 9 as the data retention power supply.

Figure 2:
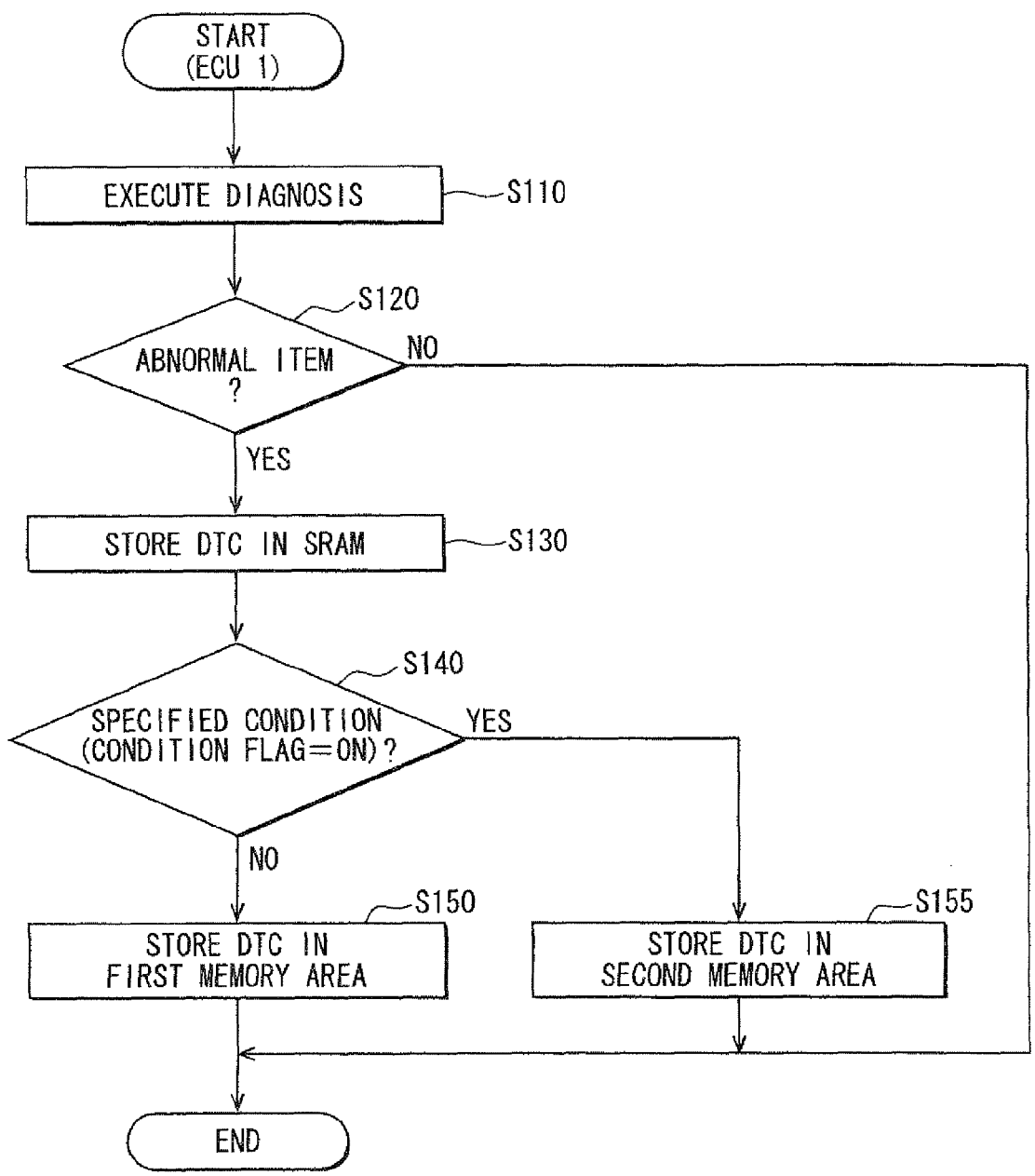
FIG. 2 is a flowchart showing diagnosis result storage processing executed by the ECU in the first embodiment.

The CPU 3 is programmed to regularly execute diagnosis result storage processing shown in FIG. 2, according to a given time period or at given intervals. It should be noted that the diagnosis result storage processing is performed separately form the normal process for controlling the engine. When the execution of the diagnosis result storage processing starts, the CPU 3 first executes a diagnosing process (self-diagnosis) for detecting any abnormality at S110. The diagnosis processing checks whether any abnormality is present in various parts of the vehicle 35 related to signals input from various vehicle devices such as sensors, switches and actuators through the input circuit 13 based on characteristics associated with the signals. The diagnosis processing is executed on a predetermined plurality of abnormality detection items. For example, in executing the diagnosis processing for detecting abnormality of a certain sensor, the CPU 3 checks whether the output value of the sensor is normal, by checking whether the output value falls within a predetermined range. If the output value does not fall within the predetermined range, the CPU 3 determines that the sensor is abnormal.

At S120, the CPU 3 checks whether any abnormality detection items have been determined as abnormal in the above-described diagnosis processing. If no abnormality detection item has been determined to be abnormal, the CPU 3 ends the diagnosis result storage processing. If an abnormality detection item has been determined as abnormal, corresponding to YES at S120, the CPU 3 proceeds to S130, and stores abnormality data (diagnostic trouble code DTC) corresponding to the item that has been determined to be abnormal in the standby RAM 9. The DTC refers to a diagnosis result indicating that the item is abnormal. When a certain condition is met, for example, when the same abnormality is detected continuously for two vehicle trips, the diagnostic trouble code is stored in the standby RAM 9 as a confirmed fault code and the malfunction indicating light MIL is turned on. Each trip may be defined as a period between on-operation and next on-operation of the ignition switch for starting an engine.

It is then checked at S140 whether a predetermined specified condition, which is set to occur after the ECU 1 has been completely assembled to the vehicle, is satisfied. Specifically, a condition flag described below is referred to. It is determined that the specified condition is satisfied, if the condition flag is in the on-state (ON). This condition flag is initialized to the off-state (OFF) when the ECU 1 is manufactured, and stored in a predetermined memory area of the EEPROM 11.

If it is determined at S140 that the specified condition is not satisfied, a DTC corresponding to the item determined as being abnormal is stored in the first memory area of the EEPROM 11 at S150. If it is determined at S140 that the specified condition is satisfied, the DTC corresponding to the item determined as being abnormal in the diagnosis processing is stored in the second memory area of the EEPROM 11 as a PDTC at S155. The PDTC is a permanent diagnostic trouble code, which is stored in the EEPROM 11 and not erasable by the command from the external tool 27. Thus, the memory area for the DTC (PDTC) is switched by S140. After S150 or S155, the diagnosis result storage processing is ended.

The condition flag referred to in S140 is switched from the initial value, the off-state to the on-state in the following manner.

Figure 3:
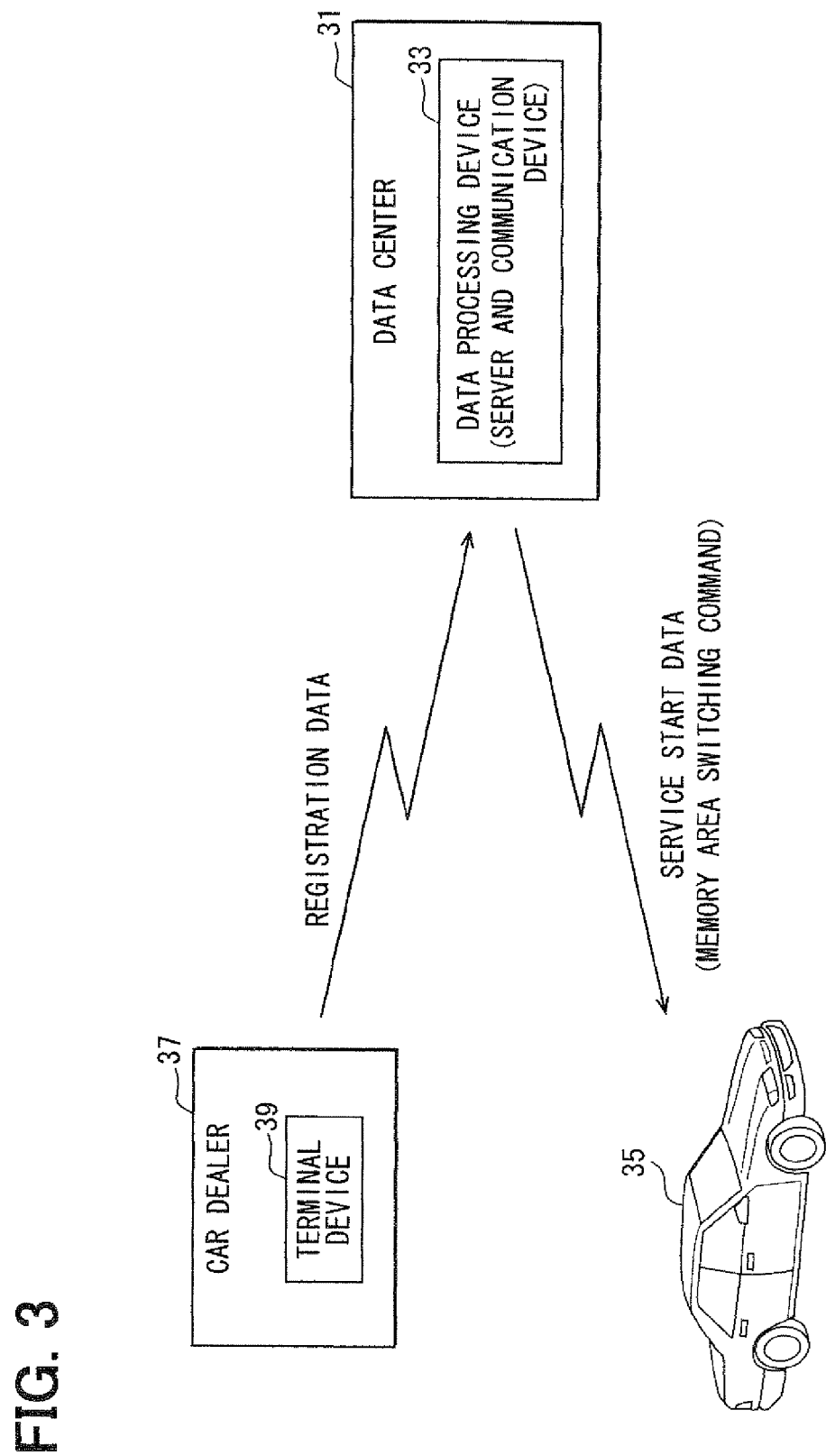
FIG. 3 is a schematic diagram showing transmission of service start data from a data center to a vehicle in the first embodiment.

As shown in FIG. 3, at the data center 31, a data processing device 33 is provided. The data processing device 33 includes a server and a communication device, and communicates with the radio communication device 25 of a vehicle 35 through a public line for cellular phone. Through communication with the vehicle 35, the data processing device 33 collects data such as the present position, operating condition or presence/absence of a failure from the vehicle 35. In return or response, the data processing device 33 transmits road traffic data or guide data of vehicle inspection and maintenance to the vehicle 35 based on the collected data, so that the data is displayed on the display device of the navigation device 23.

The data center 31 is configured to receive various data from a vehicle dealer 37 having a terminal device 39 coupled, for example, to a computer system. When the vehicle dealer 37 sells the vehicle 35 equipped with the ECU 1 to a user, registration data related to the vehicle 35 is input to the terminal device 39 before actual delivery to the user. The registration data includes, for example, a vehicle identification number and a registration number associated with the vehicle 35 and further may include the name, residence, phone number, e-mail address, and other information associated with the user. After the input of the registration data into the terminal device 39, the registration data is transmitted to the data processing device 33 through a public line or a dedicated line.

Figure 4:
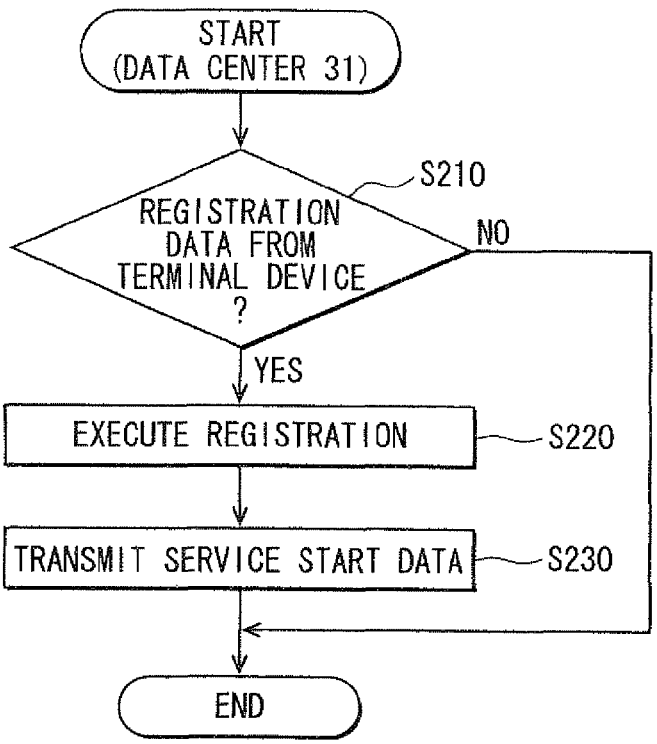
FIG. 4 is a flowchart showing service start processing executed by a data processing device of the data center in the first embodiment.

The data processing device 33 is programmed to regularly execute service start processing as shown in FIG. 4 according to a given time period. In the service start processing, it is first checked at S210 whether the registration data has been received from the terminal device 39. If the registration data has not been received, the service start processing is ended. If the registration data has been received, the processing is advanced to S220, and a registering process for storing the received registration data is conducted. Then, at S230, service start data indicating that the implementation of service has been started and communication start data are transmitted to the vehicle 35 associated with the registration data received as described above. The service start processing is thereafter ended.

In the vehicle 35, the service start data from the data center 31 is received by the radio communication device 25. Upon receiving the service start data from the data center 31, the navigation device 23 displays a message on the display device indicating and thereby notifying the user that the telematics service may be enjoyed. When the data processing device 33 transmits the service start data to the vehicle 35, the service for the vehicle 35 starts.

The navigation device 23 forwards the service start data of the data center 31 to the ECU 1 through the communication line 21. If the condition flag is in the off-state, the CPU 3 performs flag set processing shown in FIG. 5 at every given interval.

In the flag set processing, first at S310, it is checked whether the service start data has been received through the communication line 21. If it is determined that the service start data has not been received yet, the flag set processing is ended immediately. If it is determined that the service start data has been received, the condition flag in the EEPROM 11 is turned on or rewritten to the on-state at S320. After S320, the flag set processing is ended.

When it is determined that the service start data indicating the start of the telematics service has been transmitted from the data processing device 33 to the vehicle 35, it is determined that the specified condition is satisfied and the condition flag is switched from the off-state to the on-state. If the condition flag is thus switched to the on-state, abnormality is detected by the diagnosis processing (S110) of FIG. 2 and the DTC of such detected abnormality is stored in the second memory area of the EEPROM 11 by switching the memory area from the first memory area to the second memory area.

It is possible to modify the first embodiment as follows. The data processing device 33 of the data center 31 transmits a memory area switching command for instructing the switching of memory area to the ECU 1 together with the service start data at S230 in FIG. 4. This memory area switching command is forwarded from the navigation device 23 to the ECU 1 through the communication line 21. The CPU 3 checks at S310 in FIG. 5 whether the memory area switching command has been received. If it is determined that the switching command has been received, the condition flag is turned on, that is, switched over and rewritten to the on-state.

Further, when the navigation device 23 receives the service start data from the data center 31, the navigation device 23 transmits to the ECU 1 notification data indicating that the service start data has been received. The CPU 3 checks at S310 in FIG. 5 whether such notification data has been received.

Figure 6:
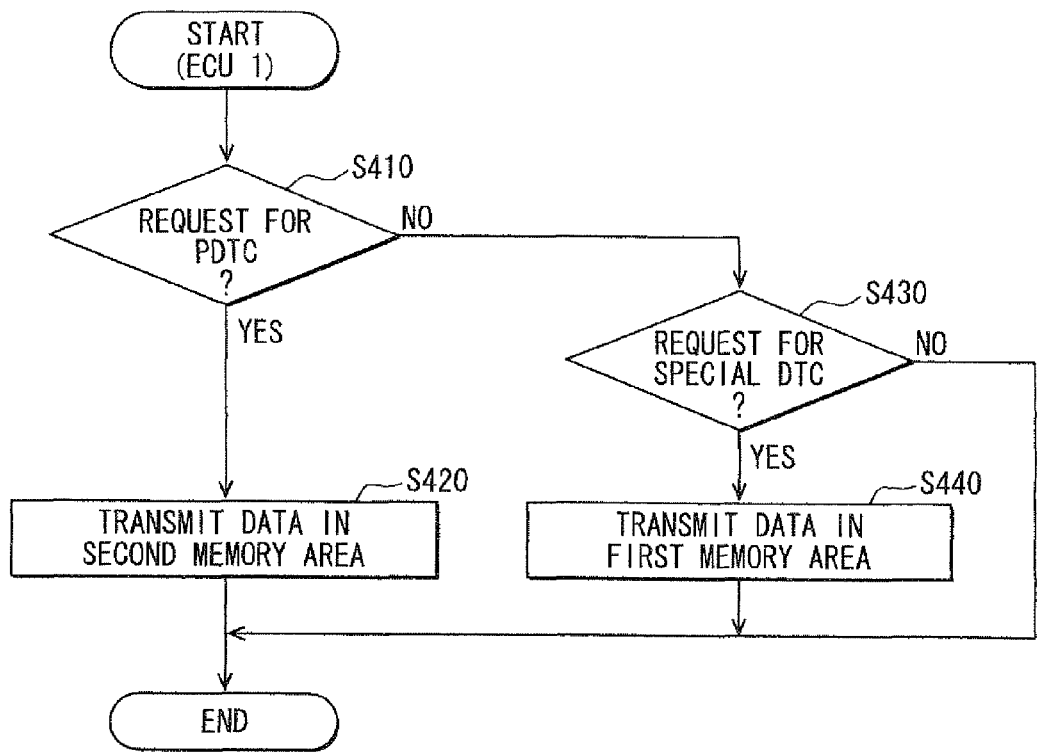
FIG. 6 is a flowchart showing abnormality data output processing executed by the ECU in the first embodiment.

The CPU 3 executes abnormality data output processing shown in FIG. 6 at every given interval, as processing for responding to a request for reading out the DTC stored in the EEPROM 11 among various commands (requests) indicating requests from the external tool 27.

In the abnormality data output processing, it is checked first at S410 whether a PDTC read-out request has been received from the external tool 27. This PDTC read-out request is a request for reading out and outputting the PDTC prescribed by the Regulations from the EEPROM 11 and corresponds to the read-out request of the abnormality data for the failure diagnosis. That is, the PDTC read-out request is a request, which a mechanic or a repair person of vehicles (operator of the external tool 27) uses at a repair (inspection or maintenance) shop, etc. for the failure diagnosis of vehicles.

If it is determined at S410 that the PDTC read-out request has been received, the DTC (that is, PDTC) stored in the second memory area of the EEPROM 11 is read out and transmitted to the external tool 27 at S420.

If it is determined at S410 that the PDTC read-out request has not been received, it is checked at S430 whether a special DTC read-out request has been received from the external tool 27. This special DTC read-out request is a request used for reading out the DTC of abnormality and checking the abnormality, which has been detected at S110 in FIG. 2 during the assembling of the ECU 1 to the vehicle, that is, before the ECU 1 was completely assembled to the vehicle. This corresponds to the special abnormality data read-out request.

If it is determined that the special DTC read-out request has not been received, this processing is ended. If it is determined that the special DTC read-out request has been received, the DTC stored in the first memory area of the EEPROM 11 is read out and transmitted to the external tool 27 at S440. After S420 or S440, the abnormality data output processing is ended.

When the external tool 27 is operated to transmit the PDTC read-out request, this read-out request is transmitted to the ECU 1. When the PDTC (DTC stored in the second memory area of the EEPROM 11 in this case) is received from the ECU 1, the external tool 27 indicates the PDTC on its display. Similarly, when the external tool 27 is operated to transmit the special DTC read-out request, this read-out request is transmitted to the ECU 1. When the DTC (DTC stored in the first memory area in this case) is received from the ECU 1, the external tool 27 indicates the DTC on its display.

According to the first embodiment, the DTC of abnormality detected in the diagnosis processing is stored in the first memory area of the EEPROM 11 until a predetermined time point (timing) when the telematics service for the vehicle 35 is started. This timing is in a period from the completion of assembling the ECU 1 to the vehicle 35 and the vehicle 35 is used by the user. After the start of the telematics service, the DTC is stored in the second memory area of the EEPROM 11. As a result, the DTC of abnormality detected in the course of assembling of the ECU 1 to the vehicle and unnecessary to be referred to in the normal vehicle repair process is stored in the first memory area of the EEPROM 11. The DTC of abnormality detected after the user started using the vehicle is stored in the second memory area of the EEPROM 11.

Only the PDTC stored in the second memory area is outputted to the external tool 27 in response to the DTC read-out request from the external tool 27. The DTC produced before the completion of assembling to the vehicle, that is, during the assembling, is not outputted to the external tool 27. As a result, the mechanic of the vehicle will not erroneously determine that the vehicle has abnormality although the vehicle is not abnormal at all. Thus, it is not necessary to erase from the EEPROM 11 the DTC produced before the completion of assembling to the vehicle.

When the special DTC read-out request is transmitted from the external tool 274 the DTC stored in the first memory area is outputted to the external tool 27. The operator of the external tool 27 can check any abnormality detected during the assembling process, that is, before the completion of assembling of the ECU 1 to the vehicle, by referring to this DTC.

The DTC produced before the completion of assembling the ECU 1 to the vehicle is also stored in the standby RAM 9 at S130 in FIG. 2. If the power supply to the standby RAM 9 is interrupted by disconnection of a vehicle battery or battery run-down, the contents of storage disappear. The contents of storage of the EEPROM 11 do not disappear even if the power supply to the standby RAM 9 is interrupted. Therefore, the DTC produced before the completion of assembling of the ECU 1 to the vehicle can be surely stored in the first memory area of the EEPROM 11. In FIG. 2, the diagnosis processing of S120 operates as diagnosing means and the processing of S140 to S155 operate as memory area switching means.

Second Embodiment

Figure 8:
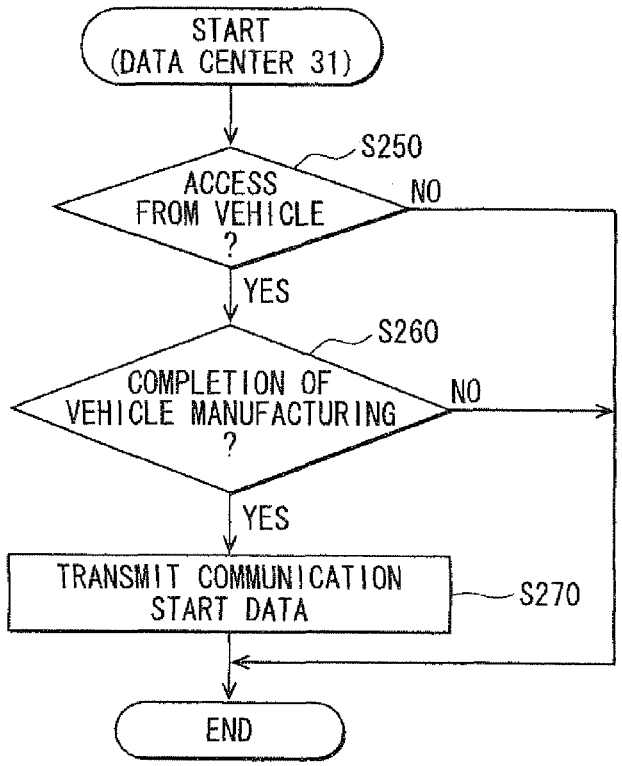
FIG. 8 is a flowchart showing communication start check processing executed by the data processing device of the data center in the second embodiment.

In the second embodiment shown in FIGS. 7 and 8, the condition for switching the condition flag from the off-state to the on-state, that is, condition for switching the memory area of storing the DTC in the EEPROM 11, is differentiated from that in the first embodiment.

In the second embodiment shown in FIG. 7, a managing device 43 including a computer is provided in a manufacturing plant 41 of the vehicle 35 into which the ECU 1 and the navigation device 23 are assembled. Management data indicating whether the manufacturing of each vehicle 35 has been completed is input to the managing device 43. The managing device 43 regularly transmits the management data to the data processing device 33 through the public line or the dedicated line according to a given time period or every time the management data is updated. The management data includes, for example, data indicative of the vehicle identification number and whether the vehicle associated with the vehicle identification number has been completed.

The ECU 1 is programmed to make a periodic access to the data processing device 33 each time electric power is supplied to the ECU 1 and the radio communication device 25. The signal that is transmitted at the time of accessing includes vehicle data such as the vehicle identification number specific to the vehicle 35.

The data processing device 33 is programmed to execute the communication start check processing shown in FIG. 8 every given period. In the communication start check processing, it is first checked at S250 whether an access has been received from the radio communication device 25. If no access has been received, the process is ended. If it is determined that the access has been received, the processing is advanced to S260.

In S260, it is checked whether the vehicle 35 that made the access has been completely manufactured, based on the management data that has been received from the managing device 43. More specifically, it is checked whether the management data indicative of the completion of manufacture of the vehicle 35 has been received from the managing device 43. If it is determined that the manufacture of the vehicle 35 has not been completed, the communication start check processing is ended. If it is determined that the manufacture of the vehicle 35 has been completed, the communication start data is transmitted to the vehicle 35 at S270, and the communication start check processing is ended.

In the vehicle 35 to which the communication start data is transmitted from the data center 31, the communication start data from the data center 31 is transferred from the navigation device 23 to the ECU 1 through the communication line 21.

Figure 5:
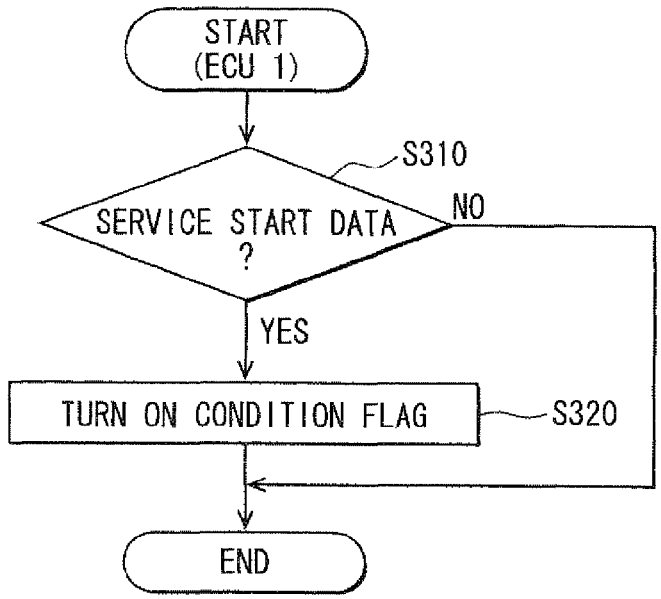
FIG. 5 is a flow chart showing flag set processing executed by the ECU in the first embodiment.

In the ECU 1, at S310 of the flag set processing in FIG. 5, the CPU 3 checks whether the communication start data has been received in place of the service start data. If the communication start data has been received, the CPU 3 switches the condition flag to the on-state at S320.

In the second embodiment, even if the radio communication device 25 starts to operate and accesses the data processing device 33 during manufacture while not yet completed, the communication start data is not transmitted from the data processing device 33. When the radio communication device 25 accesses the data processing device 33 after final assembly of the vehicle 35 has been completed, the communication start data is automatically transmitted from the data processing device 33 to the vehicle 35. As a result, the area of storing the DTC in the EEPROM 11 is switched from the first memory area to the second memory area.

According to the second embodiment also, the area of storing the DTC in the EEPROM 11 is switched from the first memory area to the second memory area at the special timing between the completion of assembling of the ECU 1 to the vehicle and the start of use of the vehicle by the user, more specifically at the timing when the communication between the radio communication device 25 of the vehicle 35 and the data processing device 33 is started successfully.

The second embodiment may be modified as follows. The data processing device 33 of the data center 31 transmits a request signal requesting the management data about the vehicle 35 at S260 in FIG. 8, and checks whether the manufacture of the vehicle 35 has been completed based on the management data transmitted from the management device 43 in response to the request signal.

Third Embodiment

Figure 9:
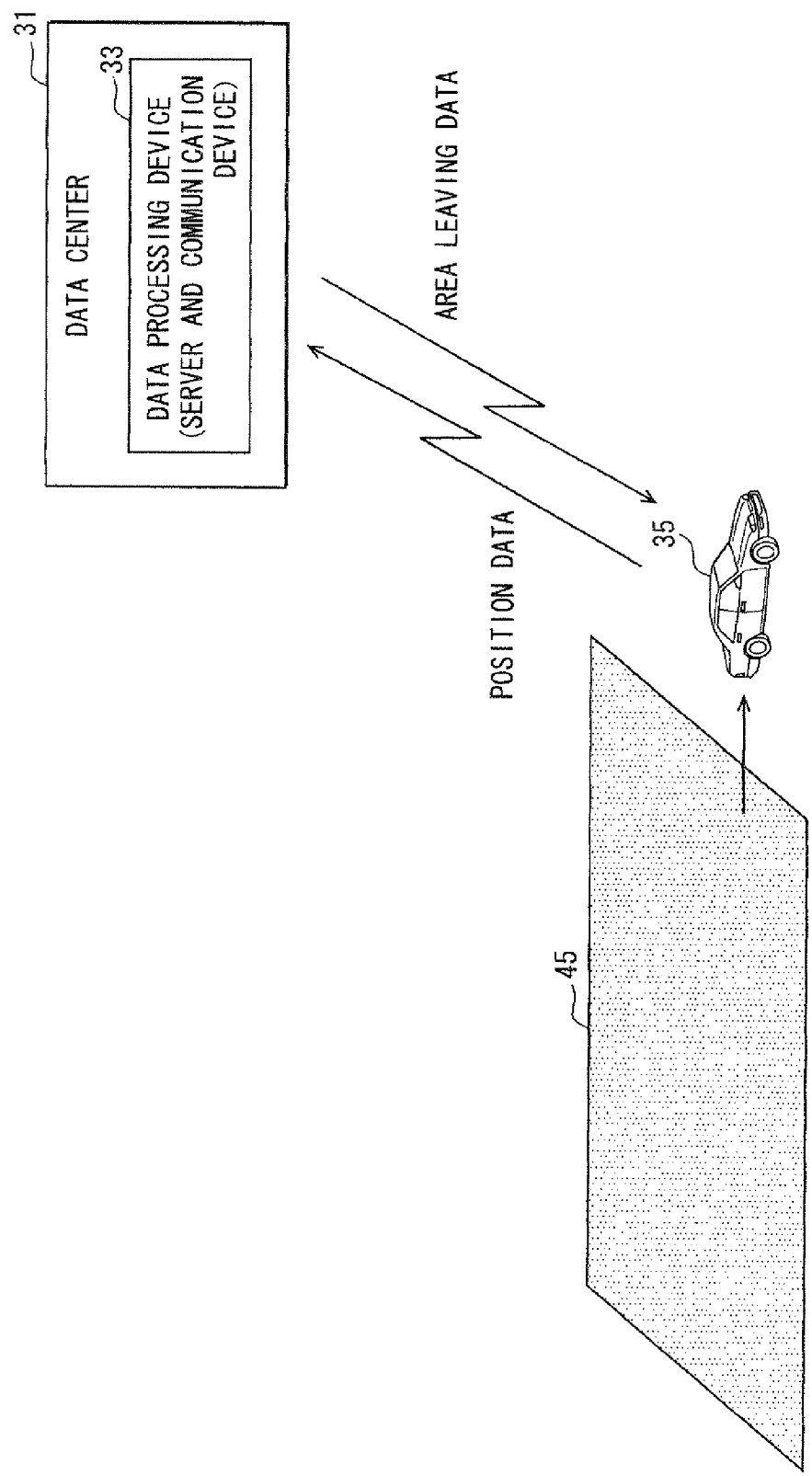
FIG. 9 is a schematic diagram showing transmission of area leaving data from the data center to the vehicle in the third embodiment.

In the third embodiment shown in FIG. 9, the condition for switching the condition flag from the off-state to the on-state is differentiated from that in the first embodiment.

In the third embodiment, a computer in the navigation device 23 is programmed to periodically transmit position data indicative of the present position of the vehicle 35 to the data processing device 33. The data processing device 33 is programmed to regularly execute the position check processing shown in FIG. 10 according to a given period, that is, at given intervals.

In the position check processing, it is first checked at S280 whether the vehicle 35 has moved out of or left a specified region 45 shown in FIG. 9 based on the position data from the vehicle 35. The specified region 45 includes a site or premise of the manufacturing plant where the vehicle 35 is manufactured or a portion associated with the site or premise where vehicles under manufacture are staged or from where completed vehicles are transported or shipped to other places such as vehicle dealers. The vehicle 35 that has moved out of the specified region 45 is a vehicle that has been completed but has not yet been delivered to and used by a user.

If it is determined that the vehicle 35 has not moved out of the specified region 45 at S280, the position check processing is ended. If it is determined that the vehicle 35 has moved out of the specified region 45, processing is advanced to S290. If it is determined that the vehicle 35 has moved out of the specified region 45 at S290, the area leaving data is transmitted and the position check processing is ended.

According to the third embodiment also, the area for storing the DTC in the EEPROM 11 is switched from the first memory area to the second memory area at the predetermined timing, which is after the completion of assembling of the ECU 1 to the vehicle and before the use of the vehicle by the user, more specifically at the timing when the vehicle 35 leaves the specified area 45. Therefore the same advantage as in the first embodiment is provided.

The specified area 45 may be set to a premise of a vehicle dealer, at which the vehicle 35 is sold, or a workshop area of the vehicle dealer, at which the old ECU of the vehicle 35 is replaced with a new one.

Modification of Third Embodiment

Figure 10:
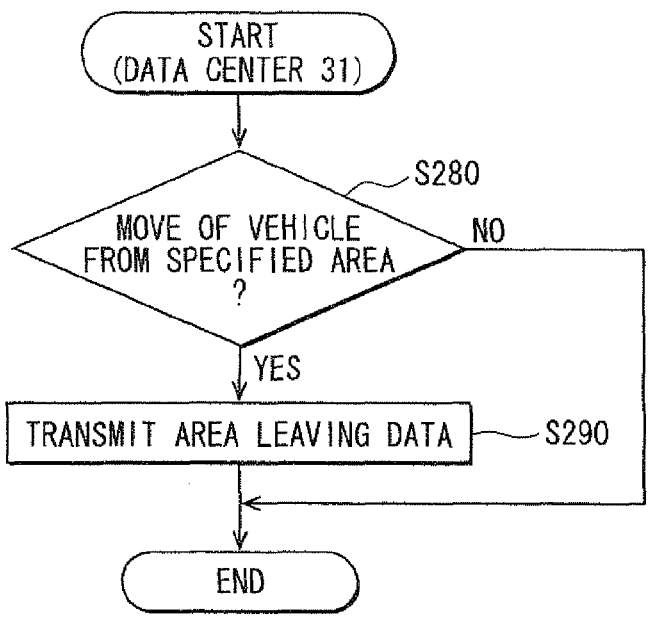
FIG. 10 is a flowchart showing position check processing executed by the data processing device of the data center in the third embodiment.

The third embodiment may be modified such that the navigation device 23 of the vehicle 35 executes the similar processing as that of FIG. 10.

Specifically, since the navigation device 23 of the vehicle 35 continuously detects the position of the vehicle 35, it may check whether the vehicle 35 has moved out of the specified area 45. If it is determined that the vehicle 35 has moved out of the specified area, the area leaving data is transferred to the ECU 1 through the communication line 21.

Fourth Embodiment

Figure 11:
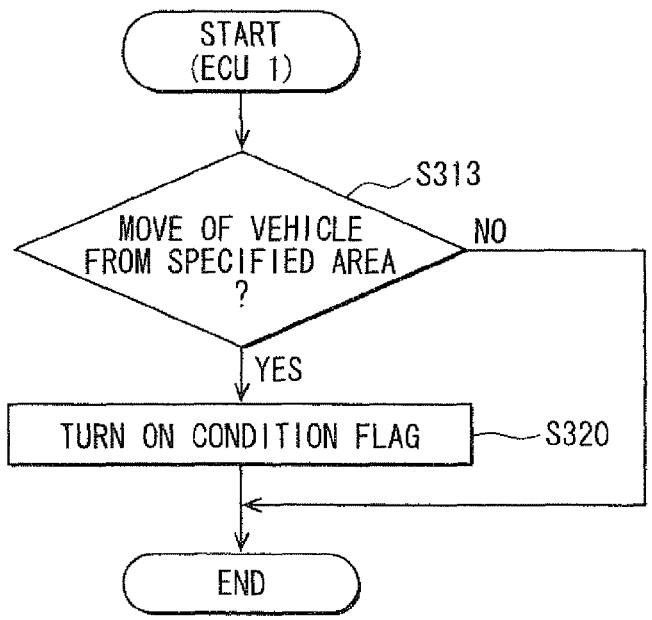
FIG. 11 is a flowchart showing flag set processing executed by the ECU in the fourth embodiment.

In the fourth embodiment shown in FIG. 11, the CPU 3 executes the flag set processing shown in FIG. 11 and the navigation device 23 regularly transfers the position of the vehicle 35 to the ECU 1 of the vehicle 35.

In the flag set processing of FIG. 11, it is checked first at S313 whether the vehicle 35 has moved out of the specified area 45 (same as in the third embodiment) based on the position information of the navigation device 23. If it is determined that the vehicle 35 has not yet moved out of the specified area, this flag set processing is ended. If it is determined that the vehicle 35 has moved out of the specified area 45, the condition flag is switched to the on-state thus ending this processing.

Thus, according to the fourth embodiment, the CPU 3 itself checks whether the vehicle 35 has moved out of the specified area 45 based on the position data. The fourth embodiment provides the same advantage as the third embodiment.

Fifth Embodiment

Figure 12:
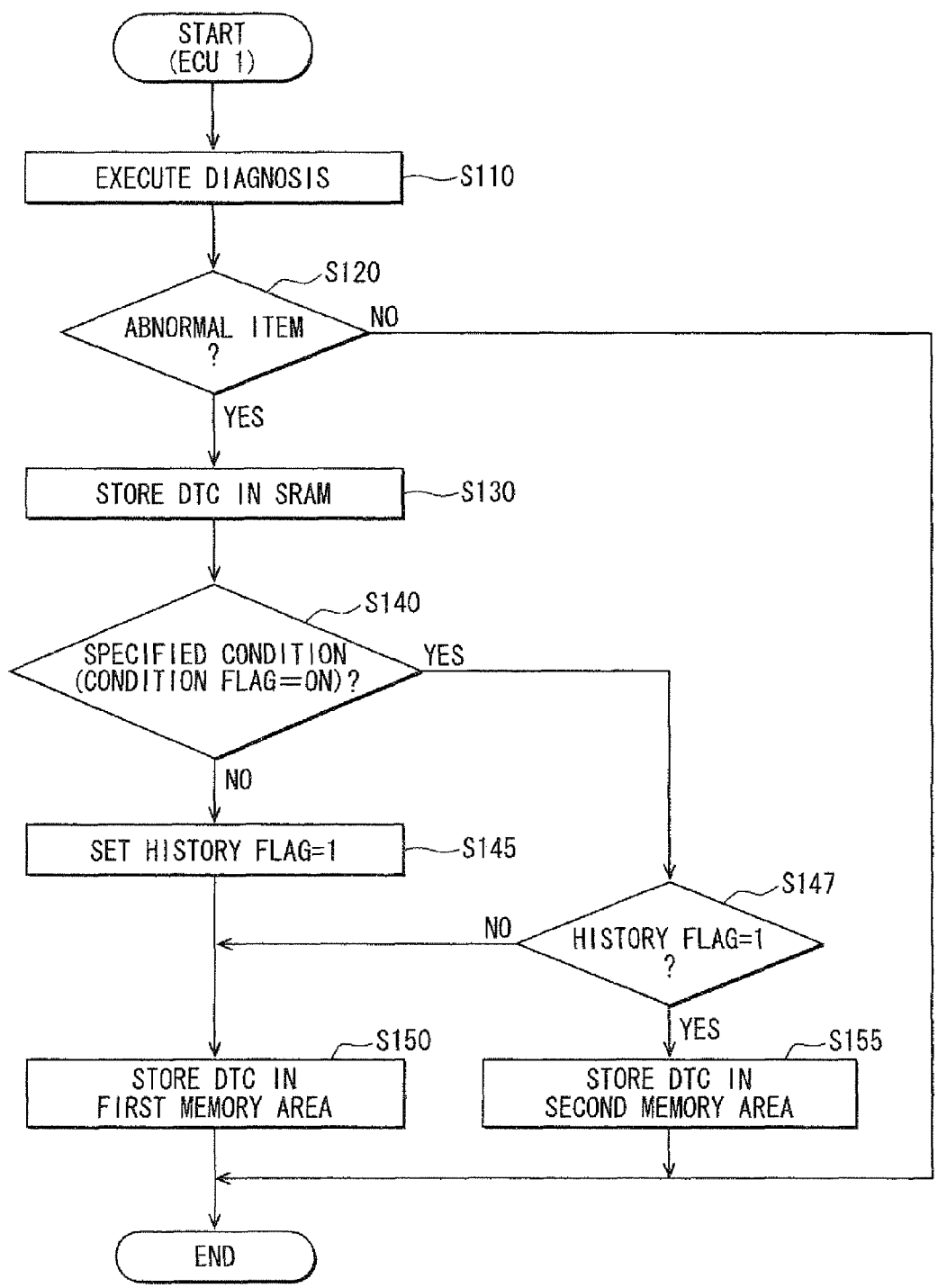
FIG. 12 is a flowchart showing diagnosis result storage processing executed by the ECU in the fifth embodiment.
Figure 13:
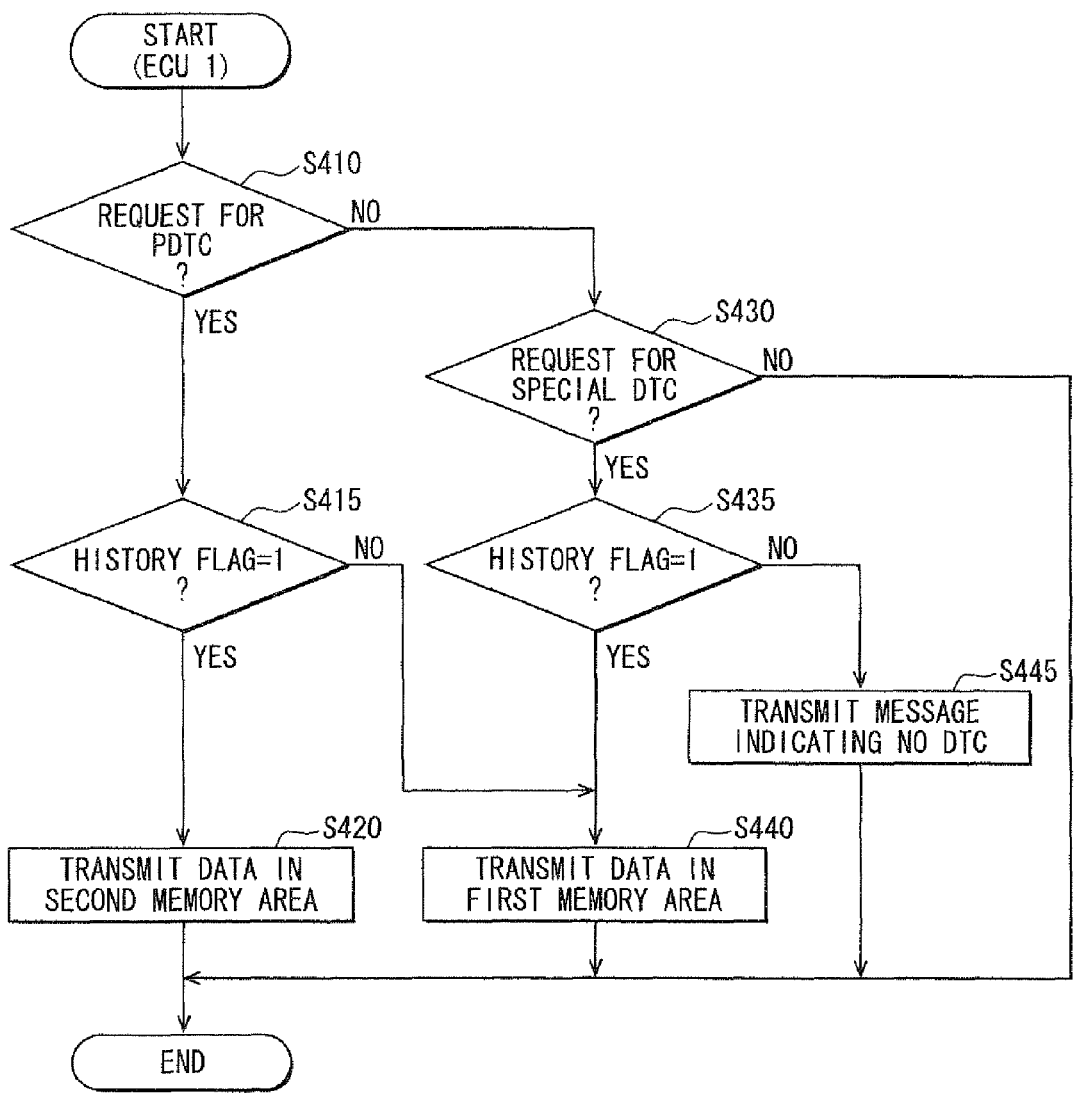
FIG. 13 is a flowchart showing abnormality data output processing executed by the ECU in the fifth embodiment.

In the fifth embodiment shown in FIGS. 12 and 13, the CPU 3 executes diagnosis result storage processing shown in FIG. 12 and abnormality data output processing shown in FIG. 13 in place of the corresponding processing shown in FIG. 2 and FIG. 6, respectively. In the diagnosis result storage processing of FIG. 12, S145 and S147 are added to the corresponding processing of FIG. 2.

If it is determined at S140 that the condition flag is in the off-state and the specified condition is not satisfied, a history flag is set (for example flag=1) at S145 and the S150 is executed. If it is determined at S140 that the condition flag is in the on-state and the specified condition is satisfied, it is checked at S147 whether the history flag has been set (flag=1). If the history flag has been set, S155 is executed. If the history flag has not been set, S150 is executed. It is noted here that the history flag is also stored in a predetermined memory area (third memory area) in the EEPROM 11 and initialized to the off-state (OFF) at the time of manufacture of the ECU 1.

In the abnormality data output processing of FIG. 13, S415, S435 and S445 are added to the corresponding processing of FIG. 6.

If it is determined at S410 that the request for reading out the PDTC has been received from the external tool 27, it is checked at S415 whether the history flag has been set. If it has been set, S420 is executed. If it has not been set, S440 is executed.

If it is determined at S430 that the request for reading out the special DTC has been received at the external tool 27 it is checked at S435 whether the history flag has been set. If the history flag has been set, S440 is executed. If it has not been set, S445 is executed so that message data indicating no DTC is transmitted to the external tool 27, thus ending this processing.

According to the diagnosis result storage processing of FIG. 12, when the abnormality is detected by S110 under the condition that the condition flag has not been set yet (S140: NO), the DTC indicating the abnormality is stored in the first memory area and the history flag is set as the history data (S145, S150). If abnormality is detected by S110 after the condition flag has been set (S140: YES), the history flag is referred to. If the history flag has not been set, the DTC is stored in the first memory area of the EEPROM 11 (547: NO to S150). If the history flag has been set, the DTC is stored in the second memory area of the EEPROM 11 (S147: YES to S155).

As a result, if any abnormality has been detected by the diagnosis processing before the condition flag is turned on, the DTC produced before the turning on of the condition flag is stored in the first memory area EEPROM 11 and the DTC produced after the turning on of the condition flag is stored in the second memory area of the EEPROM 11 as in the first to the fourth embodiments.

If no abnormality has been detected by the diagnosis processing before the condition flag is turned on, that is, if the DTC produced before the condition flag is turned on, the history flag is not turned on. Therefore, the DTC produced after the condition flag has been set is stored in the first memory area of the EEPROM 11. The memory areas of the EEPROM 11 can be used efficiently.

For this reason, in the abnormality data output processing of FIG. 13, when the request for reading out the PDTC is received from the external tool 274 the history flag is referred to. If the history flag has been set, the DTC in the second memory area of the EEPROM 11 is read out and outputted to the external tool 27 (S415: YES to S420). If the history flag has not been set, the DTC in the first memory area of the EEPROM 11 is read out and outputted to the external tool 27 (S145: NO to S440). That is, S415 specifies by the history flag the area of storing the PDTC, which is the DTC produced after the condition flag has been set and which should be read out and outputted in response to the PDTC read-out request.

When the special DTC read-out request is received from the external tool 274 the history flag is referred to. If the history flag has been set, the DTC stored in the first memory area of the EEPROM 11 is read out and outputted to the external tool 27 (S435: YES to S440). If it has not been set, it means that the relevant DTC (that is, DTC of abnormality detected before the completion of assembling the ECU 1 to the vehicle) is not stored in the EEPROM 11. Therefore, the message data indicating this is outputted to the external tool 27 (S435: NO to S445).

Sixth Embodiment

Figure 14:
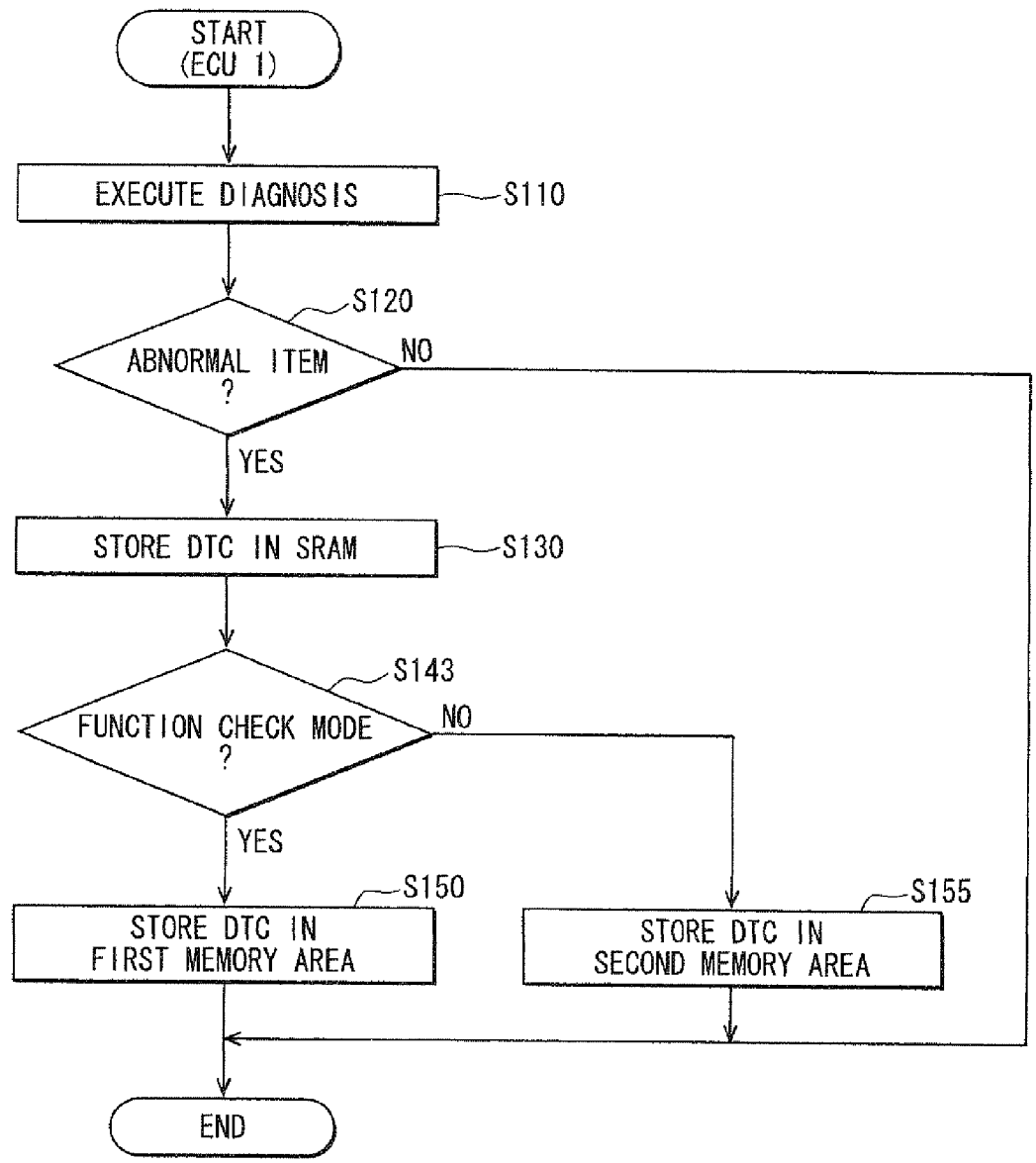
FIG. 14 is a flowchart showing diagnosis result storage processing executed by the ECU in the sixth embodiment.

In the sixth embodiment, the CPU 3 executes diagnosis result storage processing shown in FIG. 14 in place of the corresponding processing of FIG. 2 of the first embodiment. This processing of FIG. 14 is executed irrespective of the operation mode described below.

Further, the operation mode of the CPU 3 (ECU 1) is switched between the normal mode for operating normally and a function check mode. The function check mode is a special mode, which is used at the repair shop or the vehicle dealer and provided for checking the function related to the ECU 1.

In this function check mode, specified loads (for example, lights and indicators, etc. provided on an instrument panel of the vehicle) are forced to operate sequentially for confirming the operations of the loads, or special diagnosis processing stricter than the above processing with respect to normality determination requirement.

When the CPU 3 receives a function check mode transition command (command for transition to the function check mode) from the external tool 274 it operates under the function check mode. When a transition condition for transition to the normal mode is satisfied, the CPU 3 changes its operation mode from the function check mode to the normal mode.

As the condition for transition to the normal mode may be switching of the ignition switch from OFF to ON a predetermined number of times, which is set by the external tool, or receiving of a normal mode transition command from the external tool 27. The predetermined number of times of switching to ON of the ignition switch may be the number of times of ON of the ignition switch, which is required in the function check mode. This predetermined number of times may be increased by an additional number of times (for example, one, two, etc.) in consideration of the vehicle condition.

For this reason, in the manufacturing plant of the vehicle, the function check mode transition command is applied to the ECU 1 from the external tool 27 when the ECU 1 has been completely assembled to the vehicle. Thus, the ECU 1 is operated first in the function check mode to check efficiently whether there is any abnormality. For example, the lights, indicators, etc. are eye-checked by forcedly operating them as described above or the diagnosis result of the special diagnosis processing is read out to the external tool 27, thereby to check whether the sensors, switches, etc. are connected normally and operating normally.

If it is confirmed that there is no abnormality, the ECU 1 is switched from the function check mode to the normal mode by satisfying the condition required for transition to the normal mode, and then the vehicle is shipped form the manufacturing plant. It is likely that this operation is performed at the vehicle dealer when a failing ECU is replaced with a new one. This inspection mode is also referred to as a plant mode.

Therefore, in the diagnosis result storage processing of FIG. 14, the present operation mode is checked at S143, which is provided in place of S140 (FIG. 2). If it is the function check mode, S150 is executed. If it is the normal mode, S155 is executed.

According to the sixth embodiment, if any abnormality is detected by the diagnosis processing in the function check mode, which is considered to be before the completion of assembling to the vehicle, the DTC is stored in the first memory area of the EEPROM 11. If any abnormality is detected by the diagnosis processing in the normal mode, which is considered to be after the completion of assembling of the ECU 1 to the vehicle, the DTC is stored as the PDTC in the second memory area of the EEPROM 11.

That is, the DTC produced in the function check mode before the completion of assembling to the vehicle is stored in the first memory area of the EEPROM 11. The DTC produced in the normal mode after the start of use of the vehicle by the user is stored in the second memory area of the EEPROM 11. Therefore, the same advantage is provided as in the foregoing embodiments.

According to the sixth embodiment, similarly to the first embodiment, the PDTC is outputted to the external tool 27 in response to the PDTC read-out request from the external tool 27. As a result, it is prevented that the DTC, which is produced in the function check mode but is not necessary normally at the vehicle maintenance or repair process, is outputted to the external tool 27 and the mechanic of the vehicle erroneously determines that the vehicle has abnormality. Therefore, the DTC produced in the function check mode need not be erased from the EEPROM 11.

Further, similarly to the first embodiment, the DTC stored in the first memory area is outputted to the external tool 27 in response to the special DTC read-out request from the external tool 27. As a result, the user of the external tool 27 can realize the abnormality detected in the function check mode of the ECU 1 based on such a DTC.

In the sixth embodiment, S143 to S155 operate as memory area switching means.

Seventh Embodiment

Figure 15:
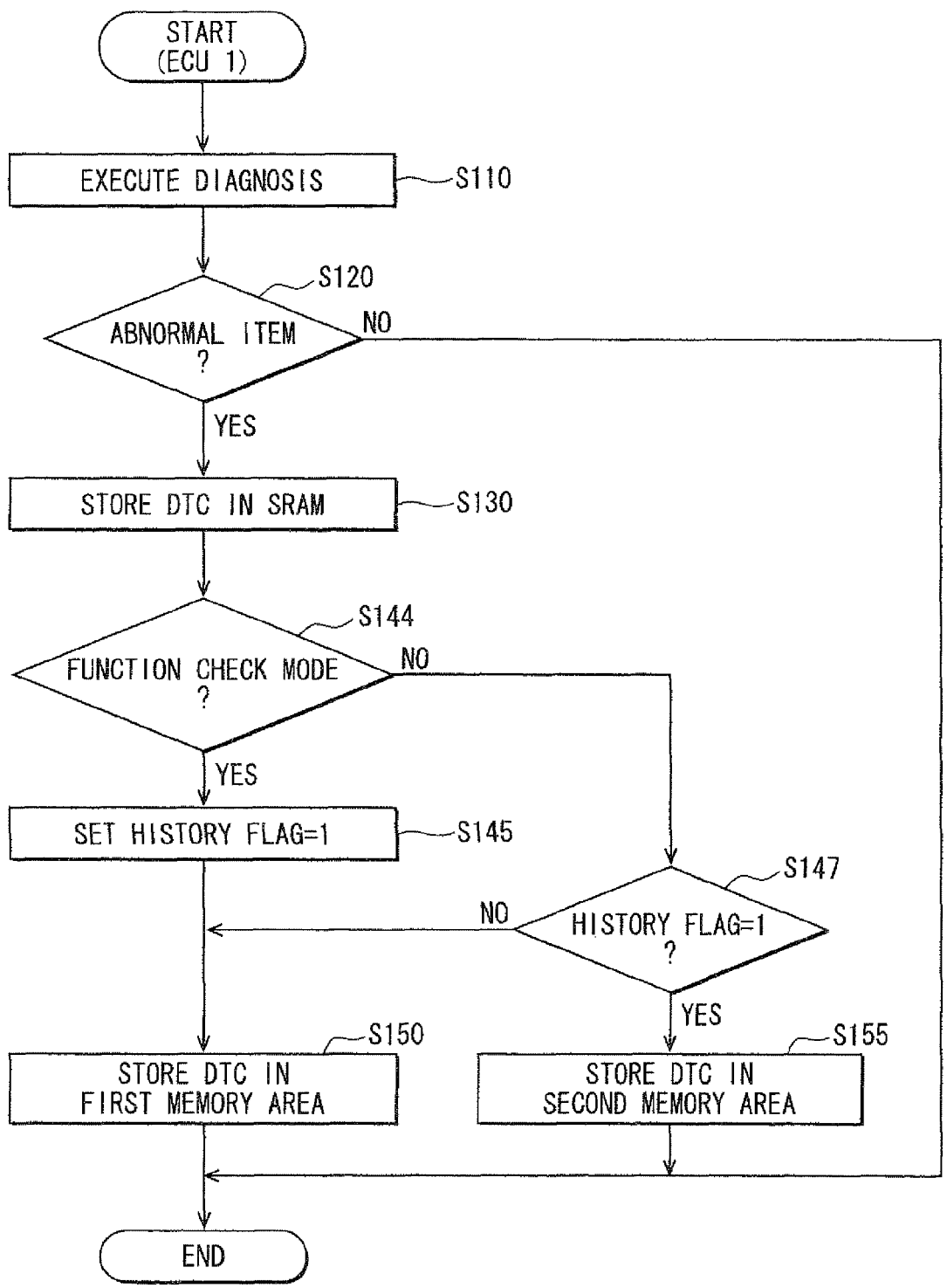
FIG. 15 is a flowchart showing diagnosis result storage processing executed by the ECU in the seventh embodiment.

The seventh embodiment shown in FIG. 15 is a combination of the fifth embodiment and the sixth embodiment.

In the seventh embodiment, the CPU 3 switches the operation mode between the normal mode and the function check mode in the similar manner as in the sixth embodiment. In addition, the CPU 3 executes the diagnosis result storage processing of FIG. 15 in place of the corresponding processing of FIG. 12. The diagnosis result storage processing of FIG. 15 is executed irrespective of the operation mode of the CPU 3.

In the processing of FIG. 15, in comparison to that of FIG. 12, it is checked at S144 in place of S140 whether the operation mode is the function check mode. If it is the function check mode, S145 is executed. If it is the normal mode, S147 is executed.

Therefore, when any abnormality is detected (S144: YES) by the diagnosis processing of S110 in the function check mode, the history flag is set as the history data (S145) and the DTC indicating this abnormality is stored in the first memory area of the EEPROM 11 (S150). When any abnormality is detected (S144: NO) by the diagnosis processing of S10 in the normal mode, the history flag is referred to (S147). If the history flag has not been set (S147: NO), the DTC is stored in the first memory area of the EEPROM 11 (S150). If the history flag has been set (S147: YES), the DTC is stored in the second memory area of the EEPROM 11 (S155).

As a result, if the abnormality is detected by the diagnosis processing in the function check mode, the DTC produced in the function check mode is stored in the first memory area of the EEPROM 11 and the DTC produced in the normal mode after the function check mode is stored in the second memory area of the EEPROM 11 in the similar manner as in the sixth embodiment. If no abnormality is detected by the diagnosis processing in the function check mode, no history flag is set. Therefore the DTC produced in the normal mode is stored in the first memory area of the EEPROM 11. Thus, similarly to the fifth embodiment, the memory area of the EEPROM 11 can be used efficiently.

In the seventh embodiment also, the abnormality data output processing of FIG. 13 is executed. In this processing, the memory area for the PDTC, which is the DTC in the normal mode and should be outputted in response to the PDTC read-out request, is specified by the history flag at S415 in the case of receiving the PDTC read-out request from the external tool 27.

Eighth Embodiment

The eighth embodiment is differentiated from the first embodiment in the following points.

As the external tool 27, a commercially available failure diagnosis device (scan tool) is detachably connected to the communication line 21. This scan tool is compatible with the OBD2 specification (code and standard).

This scan tool is connected to the communication line 21 at, for example, vehicle dealers, repair shops, maintenance shops and the like, when the failure diagnosis of a vehicle is to be performed. The scan tool has the similar function as the external tool 27 used in the first embodiment, etc.

The scan tool is configured to automatically transmit a command (support data inquiry command) to the ECU 1 to confirm the connection with the communication tool 21, when it is connected to the communication tool 21. This support data inquiry command is for inquiring the types of data, which the ECU 1 can output to the scan tool. The support data inquiry command is a series of data of $7DF, $01 and $00. $ is a sign indicating that the subsequent numbers are in hexadecimal.

When the ECU 1 receives the support data inquiry command, it transmits to the scan tool data indicating what types of data are available from itself as failure diagnosis data, which can be outputted to the scan tool. The scan tool displays these types of data on its display in the form of a list or the like. The user of the scan tool can thus recognize from the displayed data what types of diagnosis data from the ECU 1.

Figure 16:
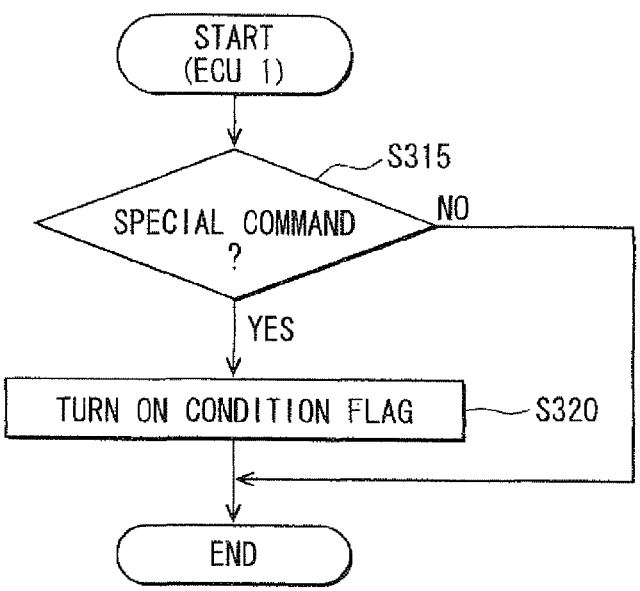
FIG. 16 is a flowchart showing flag set processing executed by the ECU in the eighth embodiment.

In the eighth embodiment, the CPU 3 executes flag set processing shown in FIG. 16 in place of the corresponding processing of FIG. 5.

Specifically, it is checked at S315 whether the support data inquiry command (special command) has been received from the scan tool. If it is determined that no such an inquiry command has been received, the flag set processing is ended. If such an inquiry command is received, the condition flag is turned on to rewrite the flag to the on-state and this flag set processing is ended.

According to the eighth embodiment, the support data inquiry command (special command) from the scan tool is used as an instruction to switch the memory area of the DTC similarly to the service start data of the data center 31 in the first embodiment.

Further, even if the ECU 1 is replaced with a new ECU after the vehicle 35 has been shipped into a market or the vehicle 35 has been shipped from the manufacturing plant without switching the memory area for storing the DTC in the EEPROM 11 from the first memory area to the second memory area, the memory area for the DTC can be switched from the first memory area to the second memory area by connecting the scan tool to the ECU 1.

Thus, immediately before the vehicle 35 equipped with a new replacement ECU or a brand new vehicle just shipped from the manufacturing plant is used by a user, the memory area for storing the DTC in the EEPROM 11 can be readily switched from the first memory area to the second memory area.

By simply connecting the scan tool to the communication line 21 of the vehicle 35 without special additional manipulations, the memory area for the DTC can be switched. As a result, it is prevented that the switching of the memory area for the DTC will not be performed due to forgetting or failure of the manipulation.

Ninth Embodiment

The ninth embodiment is differentiated from the first embodiment in the following points.

Figure 17A:
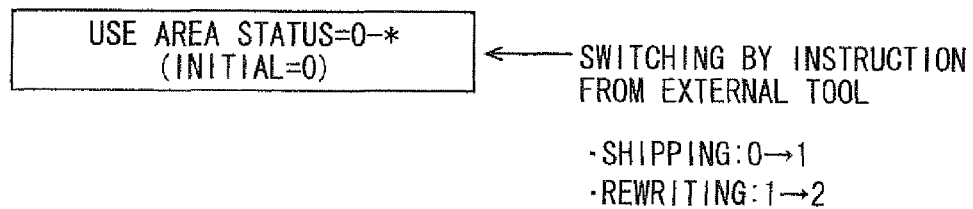
FIGS. 17A and 17B are explanatory diagrams showing use area status and EEPROM area, respectively, in the ninth embodiment.
Figure 17B:
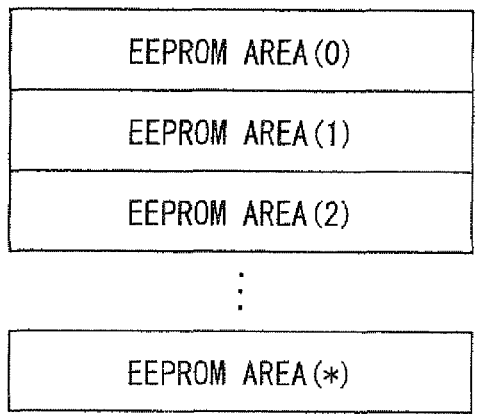

In this embodiment, each memory area of the EEPROM 11 for storing the DTC is indicated as EEPROM areas (0) to (\*) as shown in FIG. 17B. "\*" is an integer which is smaller than the number of total memory areas of the EEPROM by 1.

As shown in FIG. 17A, a use area status, which indicates the memory area of the DTC, is stored in a predetermined memory area of the EEPROM 11. For example, if the use area status values are 0 and 1, it indicates that the EEPROM area (0) and the EEPROM area (1) are for storing the DTC. The initial value of the use area status value is 0, at the time of the completion of manufacture of the ECU 1.

The CPU 3 is configured to switch the use area status value in response to a switching command from the external tool 27. Specifically, the external tool 27 transmits the switching command to the ECU 1 when a predetermined operation is performed. The CPU 3 checks whether the switching command has been received from the external tool 27. The CPU 3 increases the use area status value by 1.

Figure 18:
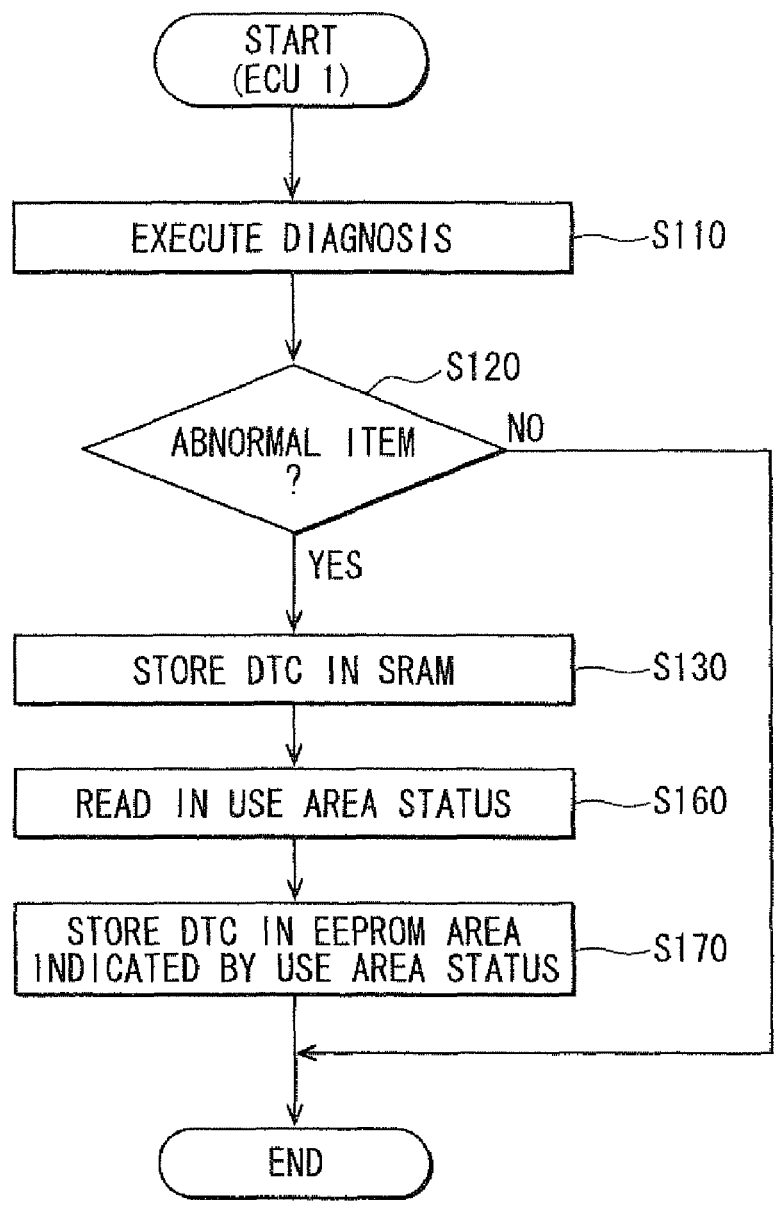
FIG. 18 is a flowchart showing diagnosis result storage processing executed by the ECU in the ninth embodiment.

The CPU 3 further executes diagnosis result storage processing shown in FIG. 18 in place of the corresponding processing of FIG. 2. In the diagnosis result storage processing of FIG. 18, S160 and S170 are executed in place of S140 to S155 of FIG. 2.

Specifically, at S160 following S130, the use area status is read in at S160. At the following S170, the DTC corresponding to the item determined to be abnormal by the present diagnosis processing (S110) is stored in one EEPROM area indicated by the use area status among the EEPROM areas (0) to (*), thus ending the diagnosis result storage processing.

In the diagnosis result storage processing of FIG. 18, no condition flag is referred to, and hence the CPU 3 does not execute flag set processing of FIG. 5.

According to the ninth embodiment, by transmitting the switching command from the external tool 27, the memory area of the EEPROM 11 for storing the DTC can be sequentially changed in the order from the EEPROM area (0), EEPROM (1), EEPROM (2) and the like.

According to the ninth embodiment, at the predetermined specified timing between the completion of assembling the ECU 1 to the vehicle and the shipment of the vehicle (for example, at the time of completion of the manufacture or shipment of the vehicle) in the vehicle manufacturing plant, the switching command is applied from the external tool 27 to the ECU 1 to update the use area status value from 0 to 1 and update the use area status value from 0 to 1. Thus, the memory area for the DTC is switched from the EEPROM area (0) to the EEPROM area (1). As a result, the DTC produced before the shipment of the vehicle from the manufacturing plant is stored in the EEPROM area (0), and the DTC produced after the start of use of the vehicle by the user is stored in the EEPROM area (1).

According to the ninth embodiment, the external tool 27 is configured to transmit the switching command to the ECU 1 to update the use area status value from 1 to 2, when the program to be executed by the CPU 3 is rewritten after the vehicle has been shipped from the manufacturing plant. As a result, the memory area for the DTC is switched from the EEPROM area (1) to the EEPROM area (2). Therefore, the DTC produced by the new program after rewriting can be stored in the EEPROM area (2), which is separate from the EEPROM area (1) storing the DTC produced by the old program before the program rewriting.

Figure 19:
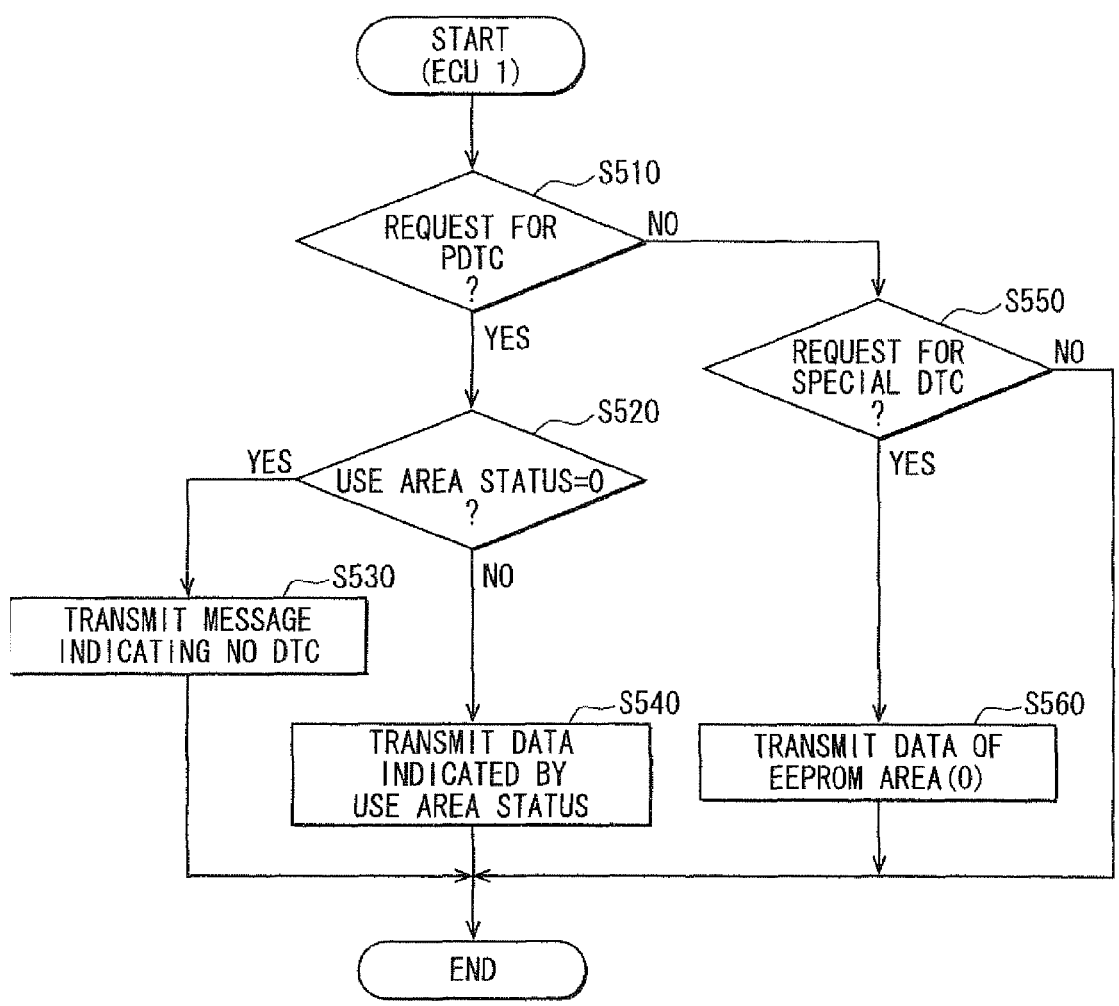
FIG. 19 is a flowchart showing the abnormality data output processing executed by the ECU in the ninth embodiment.

The CPU 3 thus executes abnormality data output processing shown in FIG. 19 in place of the corresponding processing of FIG. 6.

In the abnormality data output processing of FIG. 19, it is checked at S510 whether the PDTC read-out request from the external tool 27 has been received. If it is determined that the PDTC read-out request has been received, it is checked at S520 whether the use area status value is 0.

If the status value is 0, it means that the vehicle equipped with the ECU 1 has not been shipped yet from the manufacturing plant and hence no DTC has been produced after the user started to use the vehicle. Therefore, a message data indicating no DTC, that is, there is no DTC to be transmitted in response to the PDTC read-out request, is transmitted to the external tool 27 at S530, thus ending the abnormality data output processing.

If it is determined that the use area status value is not 0, the DTC stored in the EEPROM area indicated by the status value among the EEPROM areas (0) to (*) is read out and transmitted to the external tool 27 at S540, thus ending the abnormality data output processing.

Thus, when the ECU 1 receives the PDTC read-out request after the vehicle has been shipped from the plant, the DTC is read out from the EEPROM area indicated as the memory area for the DTC at that time point and transmitted as the PDTC to the external tool 27.

If it is determined at S510 that the PDTC read-out request has not been received, it is checked at S550 whether the special DTC read-out request has been received from the external tool 27. If it is determined at S150 that the special DTC read-out request has not been received, this abnormality information output processing is ended. If it is determined that the special DTC read-out request has been received, the DTC stored in the EEPROM area (0) is read out and transmitted to the external tool at S560, thus ending the abnormality data output processing. This DTC in the EEPROM area (0) is the DTC, which has been produced before the vehicle was shipped from the manufacturing plant and corresponds to abnormality detected in the assembling work of the ECU 1 to the vehicle.

The ninth embodiment provides the similar advantage as the first embodiment. In the ninth embodiment, S160 and S170 operate as abnormality data holding means. The use area status corresponds to determination data.

If it is likely that the operation mode of the ECU 1 is changed to the function check mode after shipment from the manufacturing plant, the following modification may be implemented.

(First Modification)

As the first modification, the use area status value is automatically increased by 1, when the operation mode is switched from the normal mode to the function check mode. Further, when the operation mode is returned from the function check mode to the normal mode, the use area status value of the function check mode is stored in a predetermined area R of the EEPROM 11 and the use area status value is returned to the previous value present before switching to the function check mode.

When the switching command is received from the external tool 27 thereafter, for example, when the program of the ECU 1 is rewritten, the use area status value is changed to a minimum value, which is other than the value of the function check mode stored in the predetermined area R and a minimum among values greater than the present value. For example, the use area status value is changed from 2 to 4, if the present value of the use area status is 2 and the value stored in the predetermined area R is 3.

In addition, the CPU 3 is configured to read out the DTC and output it to the external tool 27 at S540 in FIG. 19. This DTC is stored in the EEPROM area indicated by a value, which is other than the value stored in the predetermined area R and maximum among values of already-set use area status.

The CPU 3 is configured to read out the DTC from the EEPROM area (0) and transmit it to the external tool 27 at S560 in FIG. 19, if no value is stored in the predetermined area R. If any value is stored in the predetermined area R, the DTC is read out from the EEPROM area indicated by such a value (and also from the EEPROM area (0)) and transmitted to the external tool 27.

The CPU 3 may also be configured to automatically increase the use area status value by 1 when the operation mode is returned from the function check mode to the normal mode, without returning it to the previous value present before switching to the function check mode. The change of the use area status at the time of switching of the operation mode need not be performed automatically, but may be performed by generating the switching command from the external tool 27.

(Second Modification)

The CPU 1 may be configured to automatically set the use area status value to 0 at the time of switching from the normal mode to the function check mode, and thereafter return the status value to the previous value present before switching to the function check mode at the time of returning from the function check mode to the normal mode. The status value may be set to a value which is greater than the previous value by 1.

(Third Modification)

In the third modification, which is a modification of the ninth embodiment, the external tool 27 is configured to transmit to the ECU 1 a switching command including a value designated by any one of 0 to * by external operation. The CPU 3 is configured to set the use area status value to the value designated by the received switching command, when it is determined that the switching command has been received.

That is, it is possible to arbitrarily change the use area status value (EEPROM area in which the DTC is to be stored) by the switching command from the external tool 27.

In this example as well, the use area status value is changed from 0 to 1 at the specified timing (completion of manufacture or shipment of vehicle) in the vehicle manufacturing plant in response to the switching command from the external tool 27 to the ECU 1. If the program of the ECU 1 is rewritten thereafter, the use area status value is changed from 1 to 2.

If it is likely that the operation mode of the ECU 1 is switched to the function check mode after the vehicle has been put into the market, the use area status value is changed to 0 in response to the switching command from the external tool 27 to the ECU 1. When the operation mode is returned to the normal mode, the status value is returned to the previous value present before the change to 0 or the value greater than the previous value by 1 in response to the switching command from the external tool 27 to the ECU 1.

If the CPU 3 is configured to output the use area status value to the external tool 27 in response to the request from the external tool 274 the present value of the use area status in the ECU 1 can be readily and surely recognized by the external tool 27.

The present invention is not limited to the above embodiments and modifications but may be implemented in many other ways.

For example, the DTC stored in the EEPROM 11 as non-PTDC need not be read out, even if the special read-out request is received from the external tool 27. Such stored DTC, which is not PDTC, may be read out directly from the EEPROM 11 by disconnecting or separating the EEPROM 11 from the ECU 1.

It is possible to erase the DTC stored in the first memory area of the non-volatile memory (EEPROM 11) at the time of or after switching the memory area for storing the DTC from the first memory area to the second memory area of the non-volatile memory, thereby reducing the memory areas required for the DTC.

The non-volatile memory is normally used to store not only the DTC (PDTC) but also other data that should be continuously maintained. Such other data include learning value for engine control, or certification number or personal identification number of a vehicle security system, and the like. The first memory area of the non-volatile memory can be used most efficiently after switching the memory area.

What is claimed is:

1. An electronic control system for a vehicle comprising:
   a non-volatile memory assembled to the vehicle and rewritable with data in a plurality of memory areas thereof;
   a diagnosis unit configured to perform diagnosis based on data from devices mounted on the vehicle;
   a memory area switching unit configured to store in the non-volatile memory abnormality data detected by the diagnosis unit; and
   an output unit configured to output the abnormality data stored in the non-volatile memory in response to a read-out request,
   wherein the diagnosis unit is configured to be operable in a function check mode for performing a function checking operation and a normal mode for performing a normal operation, and
   wherein the memory area switching unit is configured to switch the memory areas of the non-volatile memory for storing the abnormality data based on whether the function check mode or the normal mode is performed when an abnormality is detected,
   the memory area switching unit is configured to store the abnormality data in a first memory area of the plurality of the memory areas of the non-volatile memory and set a history data, when the abnormality is detected in the function check mode,
   the memory area switching unit is configured to store the abnormality data in the first memory area and a second memory area of the plurality of the memory areas of the non-volatile memory, when the history data is not set and is set at a time the abnormality is detected in the normal mode, respectively, and
   the output unit is configured to output the abnormality data stored in the first memory area and the second memory area, when the read-out request is a first request and a second request, which is different from the first request, respectively.

2. The electronic control system according to claim 1, wherein the memory area switching unit is configured to store the abnormality data in a first memory area and a second memory area of the plurality of memory areas of the non-volatile memory, when the abnormality is detected in the function check mode and the normal mode, respectively.

3. The electronic control system according to claim 1, wherein:
   the diagnosis unit is configured to perform the diagnosis by sequentially operating loads in the vehicle forcibly to confirm operations of the loads.

4. The electronic control system according to claim 1, wherein:
   the diagnosis unit is configured to perform in the function check mode diagnosis processing, which is stricter than that performed in the normal mode.

5. The electronic control system according to claim 1, further comprising:
   a failure diagnosis device provided detachably to generate the first request and the second request for receiving the abnormality data stored in the first memory area and the abnormality data stored in the second memory area, respectively.

* * * * *